Oct. 13, 1959    H. H. SCHWARTZ    2,908,445
FOUNTAIN DETERGENT BRUSHES AND CONTROLS THEREFOR
Filed July 26, 1956
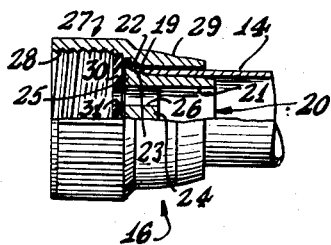
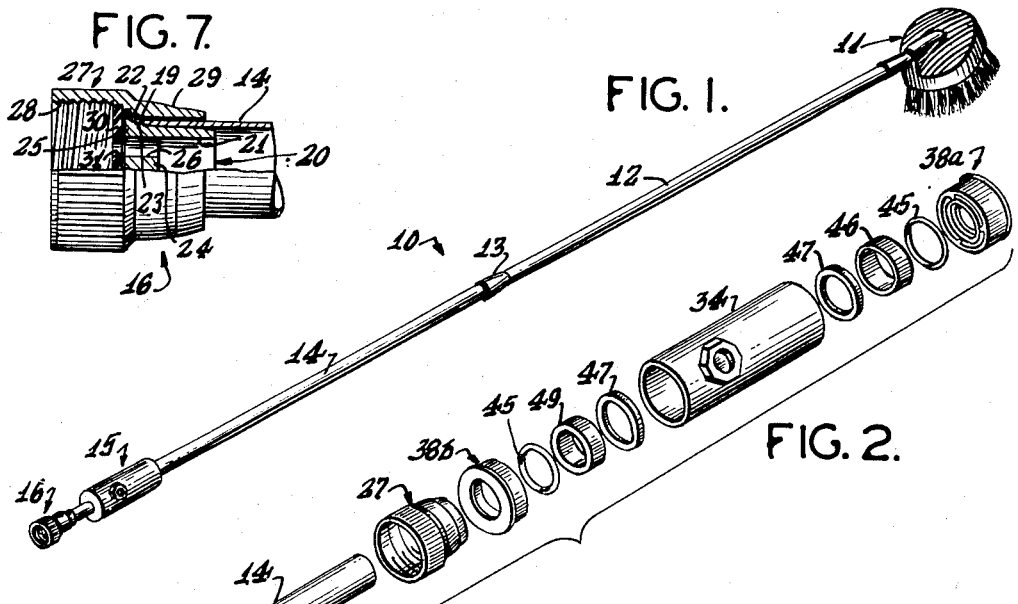
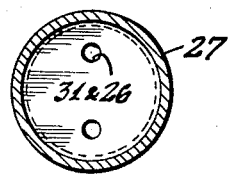
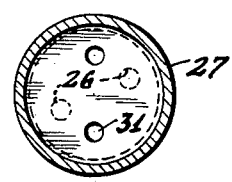
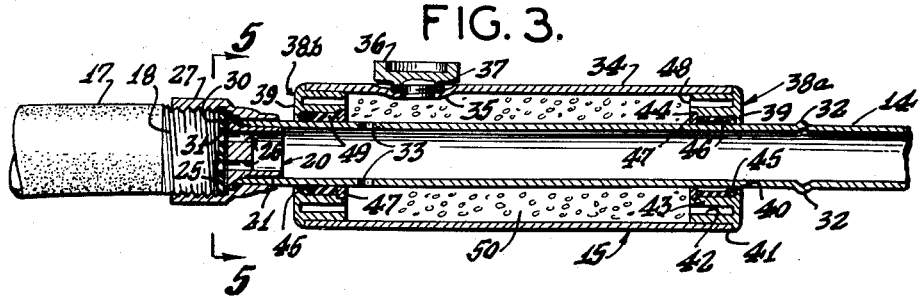
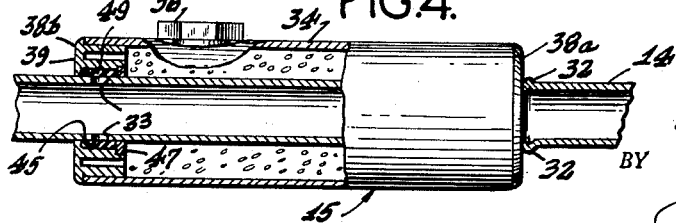
INVENTOR.
HAROLD H. SCHWARTZ
BY
J. B. Felshin
ATTORNEY.

United States Patent Office 2,908,445
Patented Oct. 13, 1959

2,908,445

FOUNTAIN DETERGENT BRUSHES AND CONTROLS THEREFOR

Harold H. Schwartz, Port Chester, N.Y., assignor to Empire Brushes, Inc., Port Chester, N.Y., a corporation of New York Application July 26, 1956, Serial No. 600,197

4 Claims. (Cl. 239—317)

It is an object to provide in a brush of the character described, highly improved means for attaching the fountain brush as described to a water hose, said attaching means being adapted to seal against leakage, and provided with a valve means for shutting off the water flow at the hose.

A further object of this invention is to provide a strong rugged and durable device of the character described, which shall be relatively inexpensive to manufacture, easy to operate and handle, and yet practical and efficient to a high degree in use.

Other objects of this invention will in part be obvious and in part hereinafter pointed out.

The invention accordingly consists in the features of construction, combinations of elements and arrangement of parts, which will be exemplified in the construction hereinafter described, and of which the scope of invention will be indicated in the following claims.

In the accompanying drawings in which is shown various illustrative embodiments of this invention, Fig. 1 is a perspective of the entire fountain brush;

Fig. 2 is an enlarged exploded view of the hose connection and concentric tube and sealing means;

Fig. 3 is an enlarged cross-sectional view of the hose concentric pipe and sealing means;

Fig. 4 is a partly cut away elevation on an enlarged scale of the concentric pipe chamber;

Fig. 5 is a cross-section on an enlarged scale taken on the line 5—5 of Fig. 3;

Fig. 6 is similar to Fig. 5; and

Fig. 7 is a partially cut away view on an enlarged scale of a hose connection means.

Referring now to the drawings in detail, numeral 10 indicates the entire assembled fountain brush such as an auto washing brush. A brush head 11 is fitted at the extreme end of a length of aluminum tubing 12 which is joined at 13 to a second aluminum pipe 14 on which the soap chamber 15 is mounted. Pipe 14 may be attached by means of coupling 16 to a water hose 17. Water hose 17 is built with a threaded metal tip 18 crimped on the end thereof. The handle end of pipe 14 is formed with an outwardly flared annular flange 19 into which is forced a plug 20. Plug 20 is formed with a cylindrical rear wall 21 thickened and flaring outwardly at the head end 22. An annular notch 23 is formed between flare 22 and wall 21. A solid head front wall 24 is formed at the head end of the plug 20. Wall 24 is formed with a flat forward surface 25 and a pair of through openings 26. The plug 20 is held within the flange end 19 of pipe 14 by means of the grip of annular notch 23.

A hose connector 27 having an internal thread 28 is fitted loosely to pipe 14. The connector 27 is formed with a cylindrical wall narrowed at the pipe end 29. The narrow end 29 of the hose connector 27 is rotatably held by flange 19 of pipe 14 which is reinforced by flange 22 of plug 20. The connector 27 may not be removed from the flange end of pipe 14 but may be rotated thereon. The threads 28 engage with threads 18 of the hose.

A flat circular rubber washer 30 formed with a pair of openings 31 corresponding to openings 26 in plug 20, is frictionally fitted in the hose connector 27 over the flat front wall 25 of plug 20, thus sealing the connection when connector 27 is screwed onto metal flange 18 of hose 17. Upon rotating pipe 14 to align holes 26 with hole 31, water will flow from hose 17 to pipe 14.

Pipe 14 is also formed with a pair of diametrically opposed raised bumps 32, at a distance from the coupling end 16. Between bumps 32 and coupling 16, pipe 14 is formed with a pair of diametrically opposed through openings 33. The soap chamber 15 lies between the bumps 32 and the coupling end 16 and surrounds the portion of the pipe formed with through openings 33. Chamber 15 is formed of a length of pipe 34 of larger diameter than pipe 14. Pipe 34 is mounted coaxially about pipe 14 and is formed at one point in its circumference with a threaded, indented opening 35. A screw plug 36 using a washer 37, may be used to seal opening 35 which opens to admit soap chips or powder. The ends of pipe 34 are sealed by valve rings 38a, 38b. Rings 38a, 38b are identical but are fitted out differently. Ring 38a has a forward wall 39 formed with an opening 40 through which pipe 14 passes. The forward disc wall 39 is formed with a flange 41 overlapping the end of the pipe 34. A rearwardly extending cylindrical flange 42 is formed extending from the front wall 39.

Cylindrical flange 42 fits snugly inside the wall of pipe 34. Spaced from flange 42 is an inner cylindrical flange 43. Flange 43 is formed with an annular groove 44 at the inside of the inward end thereof. A number of radial reinforcements may be placed between flanges 42 and 43. The facing wall 39 extends radially inwardly beyond flange 43. At the inside of the base of flange wall 43, contacting the inner surface of circular wall 39 is a rubber sealing or O ring 45. Sealing ring 45 is circular in cross section and is formed with an inner diameter approximately equal to the outer diameter of pipe 14 so as to form a snug fit therewith. The outer surface of sealing ring 45 is pressed tightly against the inner surface of flange 43. A thin metal spacer ring 46 is fitted inside of flange 43 to take up space between sealing ring 45 and notch 44. A metal washer 47 is fitted into notch 44 to hold ring 46 and sealing ring 45 in place. The outer end of flange 43 is crimped over the washer 47 in several places to secure it in place.

The rearward ring 38b is provided with a rubber sleeve 49 in place of the thin metal spacer ring 46 of ring 38a. Otherwise the construction is the same. The purpose of the rubber sealing sleeve 49 on part 38b is to overlie and cover and seal off opening 33 in one longitudinal position of the soap chamber. This is accomplished by sliding the entire soap chamber 15 forwardly. Rubber sealing ring 45 which may be formed of a suitable resilient plastic serves to seal the soap chamber against leakage of water. The chamber, of course, will slide forward only as far as bumps 32. The construction is so arranged so that when the front end of the soap chamber abuts bumps 32, the sealing spacer 49 will overlie and close openings 33. When the chamber 15 is pulled backwards as seen in Fig. 3, the openings 33 will be uncovered, thus allowing water from pipe 17 to mix with the soap 50 in the chamber 15. In such position the O rings 45 and sleeve 49 prevent leakage.

The entire water supply to the brush head 11 may be cut off by rotating pipe 14 which will in turn rotate plug 20, thus offsetting holes 26 therein from openings 31 in the rubber washer 30, as seen in Figs. 5 and 6.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter hererin set forth or shown in the accompanying drawings is to be interpreted as illustrative and not in a limiting sense.

Having thus described my invention, I claim as new and desire to secure by Letters Patent:

1. In combination, a pair of coaxial pipes, said inner coaxial pipe being formed with an opening, a ring-shaped member at each end of the outer coaxial pipe and having an inner circular cylindrical flange and an outer cylindrical flange and an outer end flange, said outer cylindrical flanges fitting within the inside of said outer coaxial pipe at the ends of the latter, said inner circular cylinder flanges being spaced from said inner coaxial pipe, a sealing O ring between each of said inner cylindrical flanges and said inner coaxial pipe, spacer rings adjacent said sealing O rings and between said inner cylindrical flange and said inner pipe, and a washer between each inner cylindrical flange and said inner pipe to keep said O rings and spacer rings between said washers and end flanges of said ring shaped members, said inner cylinder flanges being secured to said washers, said outer coaxial pipe being slidable upon said inner pipe means, one of said spacer rings comprising a rubber-like sleeve adapted to overlie said openings in said inner coaxial pipe to close said openings, in one longitudinal position of said outer coaxial pipe.

2. The combination of claim 1, said other spacer ring being formed of metal and having an inner diameter greater than the outer diameter of the inner axial pipe.

3. A soap chamber mounted on an elongated pipe, said elongated pipe being formed with an opening, said chamber comprising a coaxially mounted pipe of larger diameter than said elongated pipe, said outer pipe being formed with an opening adapted to receive a sealing plug, said outer cylindrical pipe overlying said opening in said elongated pipe, sealing ring means between said inner elongated pipe and said outer chamber pipe, said sealing ring means adjacent said openings in said inner pipe being formed with a ringed wall abutting said outer pipe, outer and inner cylindrical flanges extending inwardly from said circular wall, said outer cylindrical flange fitting within the inside wall of said outer pipe, said inner cylindrical flange being spaced from said elongated pipe, a rubber-like gasket O ring press fitted between the inner flange of said sealing ring and said inner elongated pipe, and a rubber-like sleeve spacer ring adjacent said gasket O ring, and frictionally contacting said elongated pipe and adapted to seal said opening or openings on said elongated pipe, and a washer means fixed to the inner flange and retaining said rings.

4. The combination of claim 3, said second sealing ring valve being similar to said first said ring valve, said spacer ring of said second sealing valve being formed of metallic material and having an inner diameter greater than the outer diameter of said elongated pipe.

References Cited in the file of this patent

UNITED STATES PATENTS

| | | |
|---|---|---|
| 26,994 | Hotz | Jan. 31, 1860 |
| 630,600 | Durant | Aug. 8, 1899 |
| 1,693,161 | Sandretto | Nov. 27, 1928 |
| 2,215,610 | Goldrick et al. | Sept. 24, 1940 |
| 2,401,782 | Weller | June 11, 1946 |
| 2,540,064 | Weber | Jan. 30, 1951 |
| 2,603,805 | Maestas | July 22, 1952 |
| 2,717,176 | Osrow et al. | Sept. 6, 1955 |